June 15, 1937.  F. MOMBER  2,084,041

STORAGE ROLL FOR FILMS

Filed Dec. 28, 1934

*Franz Momber* Inventor

By Attorney

Patented June 15, 1937

2,084,041

UNITED STATES PATENT OFFICE 2,084,041

STORAGE ROLL FOR FILMS

Franz Momber, Wolfen, Kreis Bitterfeld, Germany, assignor to Agfa Ansco Corporation, Binghamton, N. Y., a corporation of New York Application December 28, 1934, Serial No. 759,509
In Germany December 30, 1933

4 Claims. (Cl. 206—59)

My invention relates to a storage roll for films and one of its objects is such a roll of films subdivided into lengths, such as are used, for example, in the Leica cameras and similar small cinematograph cameras.

The storage roll consists of a spool core made in known manner of wood, metal or artificial material. On this the individual, separate lengths of film, provided, if desired, at both ends with the necessary notches, are wound one over the other, there being between each wound length and the next following length a protective paper winding which need not be connected with the length of film. The paper strip is not wound together with the length of film as is the case with known roll films, but is wrapped around the individual lengths after these have been wound.

Thus the user obtains the length of film in its final form without having to cut the ends of the film or to change the film in any way. A further advantage is that the storage roll remains ready for storage and use after removal of a length of film without any further operation and without any fresh packing.

Preferably the storage roll is made light-tight by providing the core with the known end flanges or by the known method of coloring the lateral surfaces of the film winding with a non-actinic color, or by protecting the winding from lateral access of light by sticking to it a disc of paper or like material which is impermeable to light.

According to another modification the films are not wound on a core, but are disposed in a ring of metal, cardboard or the like. The single films disposed within one another are wound so that they exactly fit one within the other. The film rolls are provided on the outside and preferably also on the inside with a protective paper. With such a package the single film lengths can be withdrawn beginning with the innermost film. The rolls may be provided with discs on the front surfaces to protect them from lateral access of light. In order to avoid that the individual film rolls may fall out there can be applied a sticking plaster on the front surfaces of the roll.

The rolls can also be packed in a light tight box, for instance, of sheet metal.

The invention will now be explained with reference to the accompanying drawing.

Figure 1:
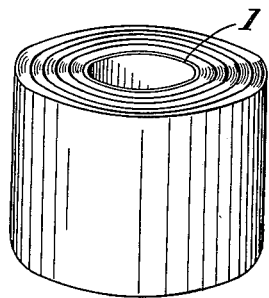

Fig. 1 shows a front view of a roll according to this invention. The films are wound on a core 1 of cardboard or the like.

Figure 2:
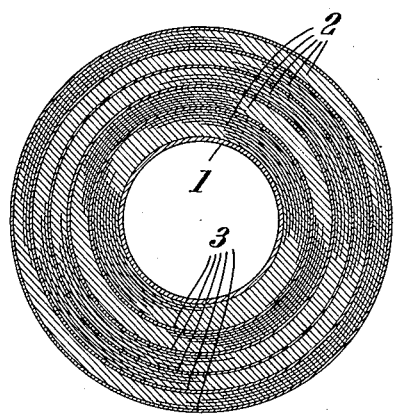

Fig. 2 shows a plan view of the film roll shown in Fig. 1. On the core 1 there are wound the films 2 with interposition of a protective paper 3.

Figure 3:
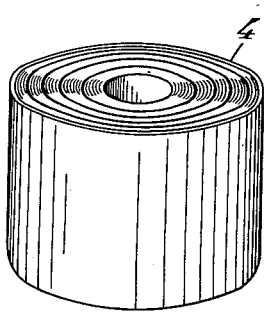

Fig. 3 shows a front view of a modified film roll. In this arrangement the individual rolls are disposed within the metal core 4.

Figure 4:
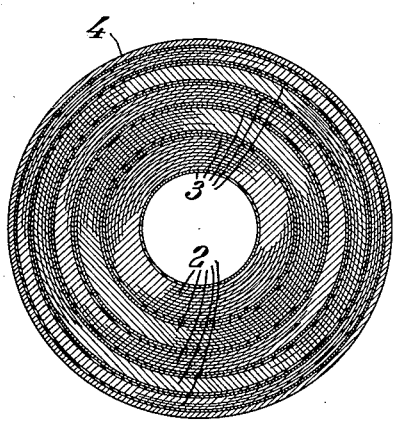

Fig. 4 shows a plan view of the roll shown in Fig. 3. Each individual film roll 2 is provided inside and outside with a protective paper strip 3. The individual rolls 2 are fitted one within the other inside the metal ring 4.

What I claim is:

1. A storage roll comprising individual lengths of film wound to separate rolls fitting within one another, a protective paper strip wound between each individual length and around the last individual length so that after unwinding an individual length of film the roll is still complete in itself.

2. A storage roll comprising a core and wound on this core individual film lengths, a protective paper strip wound between each individual length and around the last individual length so that after unwinding an individual length of film the roll is still complete in itself.

3. A storage roll comprising a metal ring and disposed within said metal ring individual lengths of film wound to separate rolls, a protective paper strip between said separate rolls and around the last roll so that after unwinding an individual length of film the roll is still complete in itself.

4. A storage roll comprising a core provided with flanges and wound on this core between the flanges individual film lengths, protective paper strips wound between the rolls of individual film so that after unwinding an individual length of film the roll is still complete in itself, and a protective paper strip wound around the outermost film roll.

FRANZ MOMBER.